(12) United States Patent
Hodgson et al.

(10) Patent No.: US 8,398,924 B2
(45) Date of Patent: Mar. 19, 2013

(54) SCR SYSTEM WITH COMPENSATION ELEMENT AND MOTOR VEHICLE HAVING AN SCR SYSTEM

(75) Inventors: Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 38 days.

(21) Appl. No.: 13/036,188

(22) Filed: Feb. 28, 2011

(65) Prior Publication Data

US 2011/0194987 A1    Aug. 11, 2011

Related U.S. Application Data

(63) Continuation of application No. PCT/EP2009/060600, filed on Aug. 17, 2009.

(30) Foreign Application Priority Data

Aug. 28, 2008  (DE) .......................... 10 2008 044 708

(51) Int. Cl.
  *B01D 50/00* (2006.01)
  *F01N 3/00* (2006.01)
(52) U.S. Cl. .......................... 422/168; 60/286
(58) Field of Classification Search ............... 422/177, 422/180, 170; 285/49, 226, 300
See application file for complete search history.

(56) References Cited

U.S. PATENT DOCUMENTS

| 3,871,690 | A  | * | 3/1975 | Wright et al. ................. 285/226 |
| 4,106,798 | A  | * | 8/1978 | Haug ............................ 285/226 |
| 6,550,250 | B2 | * | 4/2003 | Mikkelsen et al. ............. 60/685 |
| 7,264,785 | B2 | * | 9/2007 | Blakeman et al. .......... 423/213.2 |
| 7,481,042 | B2 | * | 1/2009 | Mahr .............................. 60/286 |
| 7,836,688 | B2 |   | 11/2010 | Woerner et al. |
| 2009/0013670 | A1 | * | 1/2009 | Cooke ............................ 60/286 |
| 2010/0064670 | A1 |   | 3/2010 | Starck et al. |

FOREIGN PATENT DOCUMENTS

| DE | 10 2005 029 290 A1 | 1/2007 |
| DE | 10 2007 039 424 A1 | 2/2009 |
| EP | 1 728 984 A2 | 12/2006 |
| WO | 2005/103459 A1 | 11/2005 |
| WO | 2006/136306 A1 | 12/2006 |
| WO | 2009/068186 A1 | 6/2009 |

OTHER PUBLICATIONS

International Search Report of PCT/EP2009/060600 Dated Dec. 28, 2009.

* cited by examiner

*Primary Examiner* — Tom Duong
(74) *Attorney, Agent, or Firm* — Laurence A. Greenberg; Werner H. Stemer; Ralph E. Locher

(57) ABSTRACT

An SCR system includes at least one reducing agent tank, a filter, a feed device and a reducing agent line for feeding and conducting a reducing agent. At least one compensation element has a volume through which the reducing agent flows and is suitable for varying the volume as a function of a reducing agent pressure. A motor vehicle having an SCR system is also provided.

9 Claims, 2 Drawing Sheets

SCR SYSTEM WITH COMPENSATION ELEMENT AND MOTOR VEHICLE HAVING AN SCR SYSTEM

CROSS-REFERENCE TO RELATED APPLICATION

This is a continuation, under 35 U.S.C. §120, of copending International Application No. PCT/EP2009/060600, filed Aug. 17, 2009, which designated the United States; this application also claims the priority, under 35 U.S.C. §119, of German Patent Application DE 10 2008 044 708.0, filed Aug. 28, 2008; the prior applications are herewith incorporated by reference in their entirety.

BACKGROUND OF THE INVENTION

Field of the Invention

The present invention relates to an SCR system having a compensation element and a motor vehicle having an SCR system.

SCR systems are increasingly being used in utility and motor vehicles for exhaust-gas purification of exhaust gases of internal combustion engines, with regard to emissions limit values which are currently in force and which will become even more stringent in the near future. For that purpose, various types of reducing agent are used, in particular in the form of reducing agent precursors, which are usually present in the form of an aqueous solution (Denoxium, AdBlue). When using SCR technology, it should therefore be ensured that freezing of the reducing agent is possible at low ambient temperatures or as a result of cooling effects through convection. Components of the SCR system, for example conveying devices, filters, reducing agent lines and valves, can be damaged as a result of the increase in volume due to the phase change of the reducing agent.

In that case, flexible reducing agent lines or reducing agent lines having volume compensation elements are known which increase the volume of the reducing agent line as a result of the ice pressure of the frozen reducing agent or reducing agent precursor. For example, pressure accumulators are known which, through the use of spring-loaded diaphragms, can increase or decrease a volume through which a flow passes. See, for example, the device disclosed in European Patent Application EP 0 953 739 A2, corresponding to U.S. Pat. No. 6,209,315. In that case, however, it should be noted that, when using SCR systems in passenger motor vehicles or utility vehicles, there are long operating periods during which such systems should be operated substantially without servicing. Against that background, multi-part pressure accumulators, in particular, must be regarded as being expensive to produce, susceptible to faults and high-maintenance.

SUMMARY OF THE INVENTION

It is accordingly an object of the invention to provide an SCR system with a compensation element and a motor vehicle having an SCR system, which overcome the hereinafore-mentioned disadvantages and at least partially solve the highlighted problems of the heretofore-known devices and methods of this general type and in particular provide a compensation element for an SCR system which is as free from wear and therefore servicing as possible and can be used over a long period of time without impairment of the function of the compensation element in the SCR system for internal combustion engines. Furthermore, the compensation element should have as few components as possible, should be modularly usable and should have low production costs.

With the foregoing and other objects in view there is provided, in accordance with the invention, an SCR system, comprising at least one reducing agent tank, a filter, a conveying device and a reducing agent line for conveying and conducting a reducing agent. At least one one-piece, metallic, compensation element has a volume through which the reducing agent flows. The compensation element is configured for varying the volume as a function of a reducing agent pressure.

In this case, the one-piece compensation element is, in particular, a single component which can be integrated into the SCR system. The term "one-piece" as used herein means that the compensation element may be composed of a plurality of individual parts cohesively or materially connected to one another, or it may in particular be produced from a single part. Accordingly, "one-piece" does not describe an assembly which is composed of a plurality of individual parts that are movable relative to one another and which are connected to one another only in a force-locking or form-locking fashion. Metals and metallic alloys, in particular aluminum and aluminum alloys, are suitable as materials for the compensation element. A force-locking connection is one which connects two elements together by force external to the elements, as opposed to a form-locking connection which is provided by the shapes of the elements themselves.

The compensation element is, in particular, fixedly connected to or integrated in the further components of the SCR system, such as for example the tank, the filter, the conveying device, the reducing agent line and/or the metering unit. In this case, it is preferable for connections to the components to be provided which, if appropriate, include additional (in particular sealing) elements which are not assigned to the compensation element within the context of the present invention.

In particular, the compensation element is suitable for accommodating a change in volume of the reducing agent, in particular as a result of freezing or some other phase change, either entirely or at least partially on its own or in interaction with further compensation elements, to such an extent that damage to further components of the SCR system can be prevented.

In accordance with another feature of the invention, the compensation element is constructed in the form of a bellows. In this case, the compensation element may, for example, have a round, elliptical or rectangular or polygonal cross section which remains substantially constant during the change in volume of the compensation element as a result of the folding. In this case, an embodiment of the bellows is preferable in which the folds are disposed one behind another in the flow direction of the reducing agent through the compensation element, so that the compensation element is lengthened, and therefore its volume is increased.

In accordance with a further feature of the invention, the compensation element has at least one surface part which is under preload. The surface part is movable counter to the preload at a certain reducing agent pressure, in such a way that the volume of the compensation element, through which the flow passes, is increased. In this case, it is possible, in particular, for not only a surface part of the compensation element to be under preload but for the entire circumferential surface of the compensation element to also be under preload. The circumferential surface, above a certain internal pressure, reverses the preload similarly to a so-called clicker, and in particular increases in size abruptly at a certain pressure point. This refers, in particular, to compensation elements which change their volume abruptly at a certain pressure point as opposed to compensation elements, such as the above-mentioned bellows, which in particular continuously increases or decreases its volume above a certain reducing agent pressure. In this case, the internal pressure pressure-point preferably lies above the operating pressure of the SCR system.

In accordance with an added feature of the invention, it is also advantageous for the compensation element to behave rigidly up to a reducing agent pressure of at least 5 bar, preferably at least 10 bar, and for the volume of the compensation element to increase significantly with further increasing pressure. In this case, rigid means that the volume of the compensation element varies only by at most 1% up to the stated reducing agent pressure. The compensation element is suitable for increasing the volume by at least 5%, preferably at least 10% and particularly preferably at least 20%. This is substantially also dependent on the construction. Compensation elements in the form of a bellows have the capability of increasing in volume by at least 50%, in particular by at least 70%, while compensation elements with movable surface parts can only increase in volume by at least 5%, in particular at least 10%, depending on the size of the surface part. In this case, the metallic embodiment of the compensation element is particularly advantageous. This permits adequate rigidity of the compensation element, in such a way that no substantial change in volume of the SCR system as a result of an increase in volume of the compensation elements can be effected by the operating pressure of the reducing agent. An operating pressure of approximately 8 bar regularly occurs in the SCR system. No significant change in volume of the SCR system should take place up to the above-specified maximum operating pressure. This permits precise regulation of the reducing agent flow into the reducing agent line volumes, into the conveying units, through metering units and through the valves. Accordingly, through the use of compensation elements of the type proposed, the accuracy of the SCR system with regard to the reducing agent pressure in the SCR system, and the dosing of the reducing agent into the exhaust-gas flow, is increased considerably. It is very particularly preferable for the compensation element to be disposed between the filter and a metering unit.

In accordance with an additional feature of the invention, the compensation element is connected through the use of a screw connection to at least one component of the SCR system selected from the group including the reducing agent tank, the filter, the conveying device, the reducing agent line and the metering unit. A metering unit refers to that component of the SCR system through which the reducing agent is transferred, in particular, into an exhaust line. In this case, the compensation element may, in particular, also be cohesively or materially connected to individual components, in such a way that additional sealing measures which may possibly be required are not necessary. This is advantageous, in particular, if the compensation element is integrated into a component of the SCR system (such as the conveying device or the filter). In this case, it should be noted in particular that, as a result of the fact that this compensation element is substantially maintenance-free, an exchange of the respective component is more likely to be required than an exchange of the compensation element as a result of a malfunction.

Accordingly, it is particularly advantageous for at least one compensation element to be provided in a component of the SCR system, wherein possible components are in particular the reducing agent tank, the filter, the conveying device, the reducing agent line or the metering unit.

In accordance with yet another feature of the invention, the SCR system according to the invention is also particularly advantageous if the volume of the compensation element is dimensioned in such a way that it can accommodate the entire increase in volume of the reducing agent in the SCR system when the reducing agent freezes. If the volume of the compensation element is dimensioned in this way, no damage to the SCR system occurs when the reducing agent in the SCR system freezes, even if the other reducing-agent-filled components of the SCR system, for example the conveying devices, filters, reducing agent lines or valves, have substantially no capability to compensate for changing volume.

A compensation element dimensioned in this way should be disposed in an SCR system preferably in the high-pressure region between the conveying device and the metering unit. The reducing agent is under pressure in that region during operation, so that a compensation of the increase in volume is most important in this case. Furthermore, the conveying device often has valves, so that between the conveying device and the metering unit there is a closed-off partial section in which the expansion takes place during freezing. In particular, the compensation element should be disposed close to the conveying device, because then, freezing can take place proceeding from the metering unit, through the lines toward the pump and into the SCR system, in such a way that the compensation element can expand further until the reducing agent is completely frozen.

The use of non-expandable (rigid, substantially incompressible) components in the SCR system according to the invention is advantageous, inter alia, because they prevent an increase in volume of the SCR system according to the invention during operation. In this way, the energy expenditure required for generating the operating pressure is reduced, because during operation, no additional volume need be filled with reducing agent. Furthermore, the controllability of the SCR system according to the invention is improved, and non-expandable components of that type are often less expensive. They are in part also more resistant to the reducing agent.

In accordance with yet a further feature of the invention, the SCR system according to the invention is also particularly advantageous if the SCR system has a system volume which can be increased by the compensation element by an expansion volume, with the expansion volume amounting to between 2% and 15%, in particular between 3% and 10%, of the system volume. In this case, system volume means the entire volume of the SCR system which is filled with reducing agent in operation (under normal conditions, in particular at room temperature). This also includes the volume which may be present and which exists due to the construction of the non-expanded compensation element. For example, a compensation element constructed as a bellows, even in the non-expanded state, has a volume which is filled with fluid and which should be counted as part of the system volume. Expansion volume means the volume by which the compensation element increases during expansion. It has been found that an expansion volume which amounts to between 2% and 15%, and in particular between 3% and 10%, of the system volume is particularly suitable for accommodating the volume expansion of the reducing agent in the SCR system when the reducing agent freezes.

Depending on the overall length of the lines of the SCR system according to the invention, it is particularly advantageous for the expansion volume to be between 2 ml and 5 ml in size.

With the objects of the invention in view, there is concomitantly provided a motor vehicle, comprising an SCR system according to the invention.

Other features which are considered as characteristic for the invention are set forth in the appended claims, noting that the features in the dependent claims may be combined with one another in any desired technologically meaningful manner and define further embodiments of the invention.

Although the invention is illustrated and described herein as embodied in an SCR system with a compensation element and a motor vehicle having an SCR system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
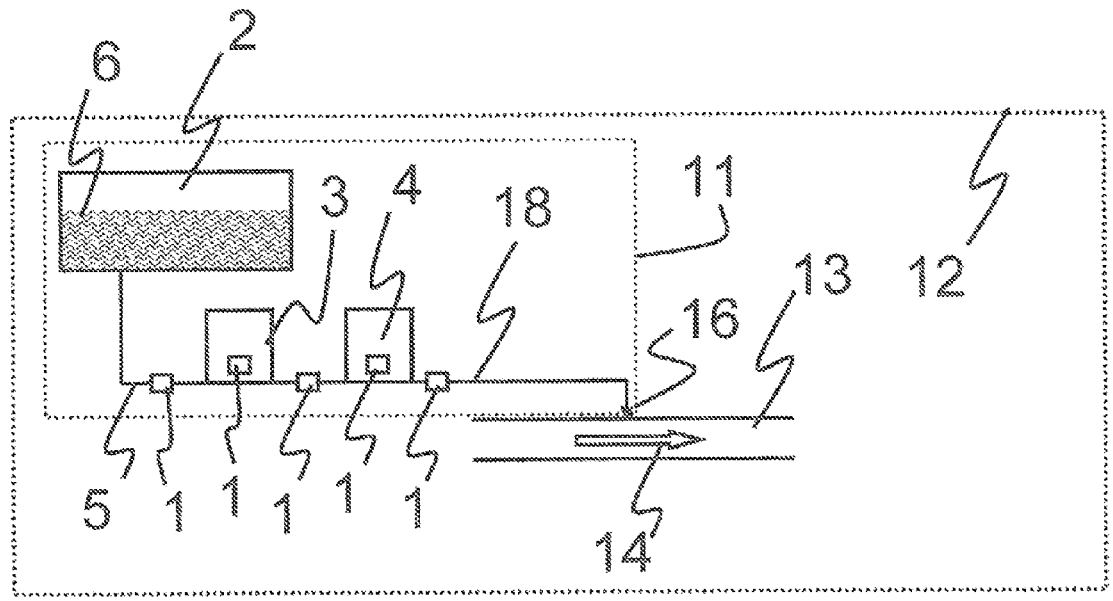
FIG. 1 is a diagrammatic, side-elevational view of components of a motor vehicle having an SCR system.

Referring now in detail to the figures of the drawing for explaining the invention and the technical field in more detail by showing particularly preferred structural variants to which the invention is not restricted, and first, particularly, to FIG. 1 thereof, there is seen a diagrammatic illustration of a motor vehicle 12 having an exhaust line 13 and an SCR system 11, with possible but not exclusive installation positions of a compensation element 1 being indicated in the SCR system 11. The SCR system 11 has at least one reducing agent tank 2, a reducing agent line 5, a filter 3 and a reducing agent conveying device 4. A reducing agent 6 is supplied from the reducing agent tank 2 to a metering unit 16 through which the reducing agent 6 is supplied to an exhaust-gas flow 14 in the exhaust line 13. The compensation elements 1 indicated within the filter 3 or within the conveying device 4 are intended to indicate that the compensation elements 1 may be integrated into the structural units of the filter 3 and of the conveying device 4. In this case, the compensation elements 1 may be provided directly at the connections of the filter 3 or of the conveying device 4 outside the housing, or else in particular additionally within the housing of the respective component. The entire SCR system 11 has a system volume 18 which is filled with reducing agent during operation.

Figure 2:
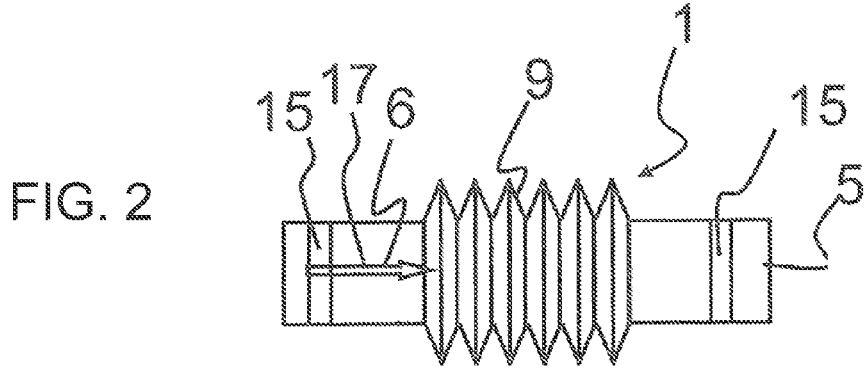
FIG. 2 is an enlarged, side-elevational view of a compensation element in the form of a bellows.

FIG. 2 diagrammatically shows the structure of the compensation element 1 as a bellows 9, with the bellows 9 extending in the longitudinal direction of the compensation element 1, and parallel to a throughflow direction 17 of the reducing agent 6 through the compensation element 1. Furthermore, screw connections 15 are provided on respective ends of the compensation element 1. The compensation element 1 is, in particular, connected to the reducing agent line 5 through the use of the screw connections 15.

Figure 3:
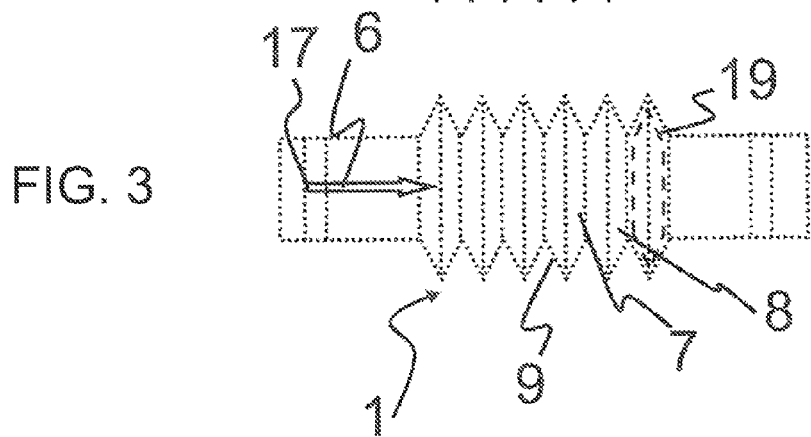
FIG. 3 is a side-elevational view of a compensation element according to FIG. 2 with an increased volume.

FIG. 3 diagrammatically shows a compensation element 1 according to FIG. 2 having a bellows 9, wherein in this case, a volume 7 of the bellows 9 has been increased by an expansion volume 19 as a result of an increased reducing agent pressure 8. In this case, the compensation element 1 is elongated in the direction of the throughflow direction 17 of the reducing agent 6 as a result of the reducing agent pressure 8.

Figure 4:
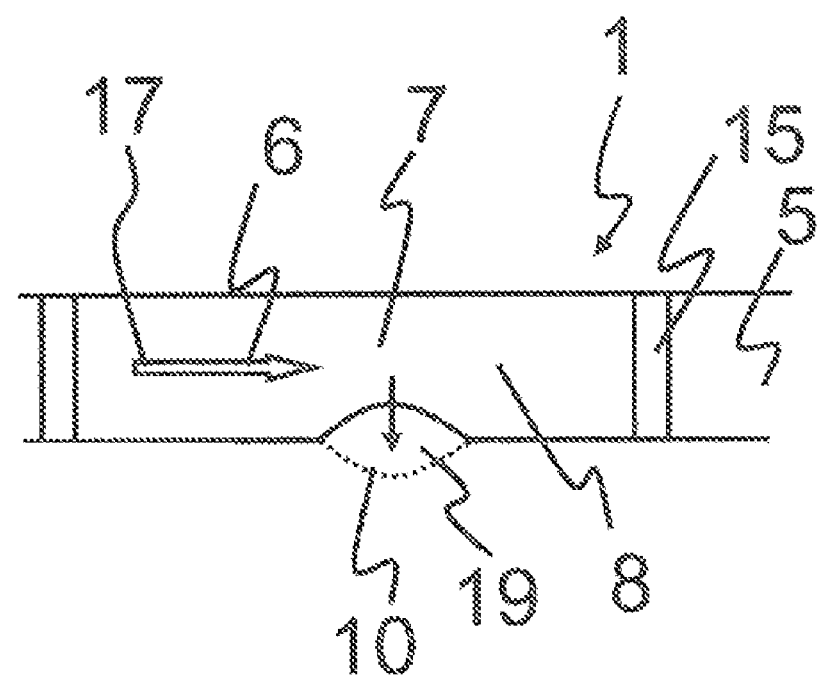
FIG. 4 is a side-elevational view of a further compensation element having a movable surface part.

FIG. 4 diagrammatically shows a compensation element 1, wherein a side wall of the compensation element 1 is provided with a surface part 10 which can expand in the radial direction of the compensation element 1 as a result of an increased reducing agent pressure 8, in such a way that the reducing agent 6 can expand (in particular only) into the expansion volume 19. That increase of the volume 7 can be reversed, in such a way that when the reducing agent pressure 8 within the compensation element 1 falls again, a return movement of the surface part 10 also takes place, which reduces the volume 7 of the compensation element 1 again. In this case, too, screw connections 15 are provided on the respective ends of the compensation element 1. The compensation element 1 is connected, in particular, to the reducing agent line 5 through the use of the screw connections 15.

In this case, the surface part 10 may extend along the compensation element 1 in any desired configuration. In particular, the entire compensation element 1 is constructed in the form of the surface part 10, in such a way that a maximum increase in volume can be attained.

The individual embodiments of the compensation elements 1 may be selected in particular with regard to their expansion direction and type. In this case, compensation elements 1 having movable surface parts 10 are advantageous in particular when installation space restrictions due to other components 2, 3, 4, 5, 16 and elements of the motor vehicle 12 oppose a targeted increase in volume 7 of the compensation element 1.

The invention claimed is:

1. An SCR system, comprising:
   at least one reducing agent tank, a filter, a conveying device and a reducing agent line for conveying and conducting a reducing agent; and
   at least one one-piece, metallic, compensation element having a volume through which the reducing agent flows;
   said at least one compensation element configured for varying said volume as a function of a reducing agent pressure;
   said at least one compensation element having at least one surface part under a preload, said at least one surface part being movable counter to said preload at a certain reducing agent pressure for increasing said volume of said at least one compensation element through which the reducing agent flows, said preload reversing above a certain pressure and said volume of said at least one compensation element changing abruptly.

2. The SCR system according to claim 1, wherein said at least one compensation element is constructed in the form of a bellows.

3. The SCR system according to claim 1, wherein said at least one compensation element behaves rigidly up to a reducing agent pressure of at least 5 bar, and said volume of said at least one compensation element increases significantly with further increasing pressure.

4. The SCR system according to claim 3, wherein said reducing agent pressure of at least 5 bar is at least 10 bar.

5. The SCR system according to claim 1, which further comprises a metering unit, said reducing agent tank, said filter, said conveying device, said reducing agent line and said metering unit being components of the SCR system, and a screw connection connects said at least one compensation element to at least one of said components.

6. The SCR system according to claim 1, wherein said volume of said at least one compensation element is configured to accommodate an entire increase in volume of the reducing agent in the SCR system when the reducing agent freezes.

7. The SCR system according to claim 1, wherein the SCR system has a system volume to be increased by said at least one compensation element by an expansion volume, and said expansion volume amounts to between 2% and 15% of said system volume.

8. A motor vehicle, comprising an SCR system according to claim 1.

9. The SCR system according to claim 1, wherein said abrupt volume change of said at least one compensation element is discontinuous.

* * * * *